Patented June 8, 1954

2,680,736

UNITED STATES PATENT OFFICE 2,680,736

PRODUCTION OF PURE DIHYDROSTREPTOMYCIN SULFATE

Jean Preud'Homme, Paris, France, assignor to Societe des Usines Chimiques Rhone-Poulenc, Paris, France, a French body corporate No Drawing. Application December 31, 1949,
Serial No. 136,397

Claims priority, application France April 2, 1949

8 Claims. (Cl. 260—210)

This invention is for improvements in or relating to the production of pure dihydrostreptomycin sulphate.

It is known that it is possible, by catalytic hydrogenation of the salts of streptomycin, to obtain the corresponding salts of dihydrostreptomycin (cf. Peck, Hoffhine and Folkers, J. A. C. S. 68, 1390, (1946), Bartz, Controulis, Crooks and Rebstock, J. A. C. S. 68, 2163 (1946), and Fried and Wintersteiner, J. A. C. S. 69, 79, (1947)). It is also known that dihydrostreptomycin, which has equivalent antibacterial properties to streptomycin, has the advantage as compared with the latter substance that it exhibits much lower neurotoxicity.

In preparing a pure dihydrostreptomycin salt, it is desirable to start with a streptomycin salt which is as pure as possible in order to avoid laborious purification of the final product. Now, it is known that the purification of streptomycin can very advantageously be carried out by crystallising the streptomycin trihydrochloride-calcium chloride double salt. It has consequently been proposed to use this double salt as starting material for the hydrogenation, especially since it is readily obtained in highly pure condition, free from streptomycin B. However, the disadvantage of employing this starting material is that, after the catalytic hydrogenation, a solution is obtained which contains calcium chloride in addition to the dihydrostreptomycin hydrochloride, a substantial inconvenience when it is desired to obtain pure dihydrostreptomycin sulphate.

It is an object of the present invention to simplify the production of pure dihydrostreptomycin sulphate. A further object is to enable the use of streptomyin trihydrochloride-calcium chloride double salt in the production of pure dihydrostreptomycin sulphate without inconvenience to purification of the desired product due to presence of calcium ions.

The aforesaid objects are accomplished according to the present invention by catalytic hydrogenation of streptomycin trihydrochloride-calcium chloride double salt and precipitation of calcium ions by means of ammonium carbonate prior to formation of the desired sulphate. The ammonium chloride formed on treatment with ammonium carbonate, remains in solution and does not in any way disadvantageously affect the crystallisation of the dihydrostreptomycin sulphate produced on conversion in known manner of the dihydrostreptomycin hydrochloride content.

The treatment with ammonium carbonate may be carried out either before or after the hydrogenation of the complex. To bring about complete precipitation of the calcium by the ammonium carbonate, it is necessary to adjust the pH of the solution to a fairly high value (about 8) by means of a base, more especially ammonia. Both streptomycin and dihydrostreptomycin are still very stable at this pH. The calcium carbonate formed in the course of the reaction precipitates in readily filterable form and may consequently be separated from the solution without difficulty.

The final solution containing the dihydrostreptomycin hydrochloride together with ammonium chloride is suitably treated in order to convert the hydrochloride into sulphate and to separate the latter from the mother liquid.

The process of this invention is illustrated in the following example.

Example 270 g. of a pure streptomycin trihydrochloride-calcium chloride complex are hydrogenated by the method described by Peck, Hoffhine and Folkers (loc. cit.) for streptomycin hydrochloride. To the solution thus obtained (680 cc.), which contains dihydrostreptomycin hydrochloride and calcium chloride, is gradually added a 250 g. per litre ammonium carbonate solution until further addition of this reagent produces no more precipitation, for which about 85 cc. are required. To this solution, dilute ammonia is added until the pH reaches about 8. After a quarter of an hour, the solution is filtered to separate the calcium carbonate which has precipitated. A precipitation test with ammonium oxalate on a portion of the solution shows absence of calcium. This solution is acidified to a pH of about 4.5 by adding dilute sulphuric acid, whereafter 75 g. of pure ammonium sulphate are added. After dissolution, a volume of methyl alcohol equal to twice the volume of the aqueous solution is gradually added over a period of some hours with agitation, and the crystallisation is initiated by adding a little pure, crystalline dihydrostreptomycin sulphate. When the crystallisation of the sulphate is complete, it is filtered off and washed with dilute aqueous methyl alcohol, and then with anhydrous methyl alcohol. After drying, 229 g. of pure dihydro-streptomycin sulphate are obtained, i. e. a yield of 87% of theory.

The product obtained has a potency of 850 units per mg. (turbidimetric determination, employing *Klebsiella Pneumoniae* as a test organism, in accordance with the method described by the United States Food and Drug Administration in "Compilation of regulation for tests and methods of assay and certification of antibiotic drugs," vol. 1, p. 60). It dissolves readily in water, giving a colourless limpid solution. Calcination in the presence of sulphuric acid leaves no residue; it contains no perceptible trace of chloride and less than 0.1% of ammonia (expressed as $NH_4$).

I claim:

1. In a process for the production of pure dihydrostreptomycin sulphate from a solution of the corresponding hydrochloride prepared by the catalytic hydrogenation of a solution of streptomycin trihydrochloride-calcium chloride double salt, the step of removing calcium ions by the addition of ammonium carbonate before hydrogenation and separating the calcium carbonate thus precipitated.

2. In a process for the production of pure dihydrostreptomycin sulphate from a solution of the corresponding hydrochloride prepared by the catalytic hydrogenation of a solution of streptomycin trihydrochloride-calcium chloride double salt, the step of removing calcium ions by the addition of ammonium carbonate after hydrogenation and separating the calcium carbonate thus precipitated.

3. A process for the production of pure dihydrostreptomycin sulphate which comprises the catalytic hydrogenation of a solution of streptomycin trihydrochloride-calcium chloride complex, adjusting the pH value of the resultant solution to a value in the neighbourhood of 8, adding ammonium carbonate to the solution to precipitate the calcium content as calcium carbonate, removing the calcium carbonate and, converting the dihydrostreptomycin hydrochloride content into the corresponding sulphate by metathesis and separating the sulphate.

4. A process for the production of pure dihydrostreptomycin sulphate which comprises adding ammonium carbonate to a solution of streptomycin trihydrochloride-calcium chloride complex with a pH in the neighbourhood of 8 to precipitate the calcium content as calcium carbonate, removing the calcium carbonate and catalytically hydrogenating the solution, converting by metathesis the dihydrostreptomycin hydrochloride thus obtained into the corresponding sulphate and separating the sulphate.

5. A process as claimed in claim 3 wherein the solution is adjusted to a pH of about 8 by the addition of ammonia.

6. A process as claimed in claim 4 wherein the solution is adjusted to a pH of about 8 by the addition of ammonia.

7. A process for the production of pure dihydrostreptomycin sulphate which comprises the catalytic hydrogenation of a solution of streptomycin trihydrochloride-calcium chloride complex, adding ammonium carbonate to the solution to precipitate the calcium content as calcium carbonate, adjusting the pH value of the resultant solution to a value in the neighbourhood of 8, removing the calcium carbonate and converting the dihydrostreptomycin hydrochloride content into the corresponding sulphate by metathesis and separating the sulphate.

8. A process for the production of pure dihydrostreptomycin sulphate which comprises forming a solution of streptomycin trihydrochloride-calcium chloride double salt, subjecting the said solution to catalytic hydrogenation, adding to the solution at some stage in the process ammonium carbonate to precipitate calcium carbonate, and separating the said calcium carbonate from the solution, and converting the dihydrostreptomycin dihydrochloride obtained into the corresponding sulphate by metathesis.

References Cited in the file of this patent

UNITED STATES PATENTS

| Number | Name | Date |
| --- | --- | --- |
| 2,443,485 | Waksman et al. | June 15, 1948 |
| 2,446,102 | Peck | July 27, 1948 |
| 2,498,574 | Peck | Feb. 21, 1950 |
| 2,541,420 | Howe et al. | Feb. 13, 1951 |
| 2,552,547 | Fried et al. | May 15, 1951 |
| 2,590,141 | Wolf | Mar. 25, 1952 |

FOREIGN PATENTS

| Number | Country | Date |
| --- | --- | --- |
| 611,984 | Great Britain | Nov. 5, 1948 |

OTHER REFERENCES

Bartz, J. A. C. S. (1946), pages 2163–2166.